(12) United States Patent
Lee et al.

(10) Patent No.: US 8,442,117 B2
(45) Date of Patent: May 14, 2013

(54) METHOD OF BLOCK MATCHING-BASED MOTION ESTIMATION IN VIDEO CODING

(75) Inventors: Jiann-Der Lee, Taoyuan County (TW); Hao-Hang Hsu, Taoyuan County (TW)

(73) Assignee: Chang Gung University, Gaoyuan County (TW)

( * ) Notice: Subject to any disclaimer, the term of this patent is extended or adjusted under 35 U.S.C. 154(b) by 198 days.

(21) Appl. No.: 13/170,736

(22) Filed: Jun. 28, 2011

(65) Prior Publication Data

US 2011/0255604 A1 Oct. 20, 2011

Related U.S. Application Data

(63) Continuation-in-part of application No. 11/389,718, filed on Mar. 27, 2006, now abandoned.

(51) Int. Cl.
*H04N 7/12* (2006.01)
(52) U.S. Cl.
USPC ..................................................... 375/240.16
(58) Field of Classification Search ................... 375/240
See application file for complete search history.

(56) References Cited

U.S. PATENT DOCUMENTS

| 7,426,237 | B2 | 9/2008 | Lee et al. |
| 2002/0015513 | A1 | 2/2002 | Ando et al. |
| 2008/0260023 | A1 * | 10/2008 | Sung .......................... 375/240.03 |

* cited by examiner

*Primary Examiner* — David Czekaj
*Assistant Examiner* — Tsion B Owens

(57) ABSTRACT

Motion estimation is efficient to reduce redundant information among successive frames in video compression applications. The blocks in the current frame can be replaced with the neighboring blocks in the spatial directions in the previous frame with small errors. Many types of motion estimation methods such as Block Matching Algorithm are widely used to take a balance between a good image quality and the computation complexity. A Block Matching Algorithm named as New Cellular Search (NCS) Algorithm utilizes two particular search patterns: HCSP and VCSP, in the horizontal and vertical directions to search the best motion vector. Three performance measurements including peak signal to noise ration (PSNR), Average Search Point (ASP), and Mean Square Error (MSE) are used to compare this new search algorithm with some major motion estimations like FS, TSS, CS, and NCDS. The NCS is very efficient in computation reduction while keeping the almost same picture quality.

3 Claims, 5 Drawing Sheets (a)

(b)

US 8,442,117 B2

METHOD OF BLOCK MATCHING-BASED MOTION ESTIMATION IN VIDEO CODING

CROSS-REFERENCED TO RELATED APPLICATIONS

This application is a continuation-in-part of application Ser. No. 11/389,718 filed Mar. 27, 2006 entitled "Method for Block Matching-Based Motion Estimation in Video Coding" and which is hereby incorporated herein by reference in its entirety.

STATEMENT REGARDING FEDERALLY SPONSORED RESEARCH OR DEVELOPMENT

Not applicable

BACKGROUND OF THE INVENTION

1. Field of the Invention

This invention relates to a method for block matching-based motion estimation in video coding and particularly to a novel block-matching-based motion estimation, in the field of video coding, to reduce inter-frame redundancy.

2. Description of Related Art

Motion Estimation is an effective method of reducing inter-frame redundancy at the time of video coding. Generally speaking, in the motion estimation technology, comparison between previous videos is made to search a piece of adequate video information as a substitute, which is thus an operation process that is continuously repeated and requires a great deal of data for comparison. In different methods of motion estimation, block matching is a very simple and extremely effective method. Conventionally, there are many motion estimation algorithms that have been proposed to reduce the high complexity of calculation of the block matching and to meanwhile keep a good image quality. Among them, the cellular search algorithm is currently generally accepted to be effective and speedy.

Consequently, because of the technical defects described above, the applicant has kept on carving unflaggingly through wholehearted experience and research to develop the present invention, which can effectively improve the defects described above.

SUMMARY OF THE INVENTION

In a technical problem to be solved with this invention, owing to a current technology of cellular algorithm, there are still excessive search points so that image blocks are compared still too slow, which is necessarily improved.

To solve the problem, a novel block-matching-based motion estimation in video coding according to this invention is provided, which can be rapidly processed using a computing device well-known to those skilled in the art. The present invention clearly simplifies and reduces the amount of data that needs to be processed to arrive at the present motion estimation and includes three steps.

Step 1, the origin in the area of search is first set to a central search point in the Horizontal Cellular Search Pattern (HCSP) and the coordinates are set to (0, 0). Next, error values between six candidate points and the central point around the block and HCSP are calculated. If a minimum error value occurs at the central point, the process jumps to step 3; if it occurs at the rest of six candidate points outside, then step 2 is executed.

Step 2, if the minimum error value occurs horizontally, the position of the minimum error value as Mean Absolute Distance (MAD) searched at step 1 is set to a new central point in HCSP; on the contrary, if the minimum error value occurs vertically, it is set to a new central point in Vertical Cellular Search Pattern (VCSP) and re-calculation is made for a new error value as MAD. If the minimum error value as MAD lies in the central point in the mode of HCSP or VCSP, a jump is made to step 3 otherwise step 2 is repeated.

Step 3, MAD values at points 3 and 6 are compared. If the MAD value at point 3 is lower, MAD values at points 1 and 8 are calculated and two lower MAD values are found; If the MAD value at point 6 is lower, MAD values at points 1 and 9 are calculated and two minimum MAD values are found. Finding the coordinates of minimum error value as MAD at this step is exactly finding an optimal motion vector for the matching block.

Advantageously, the candidate block and the current block at step 2 are compared in HCSP and VCSP with the minimum error values given in the measurement algorithm.

At step 2, 7 candidate points are not required for calculation at each time of search, only 3 candidate points may be required for calculation.

From the effects of previous technologies, based on peak signal to noise ratio (PSNR), Average Search Point (ASP), and Mean Square Error (MSE) as objective methods of performance and efficiency measurement, an image motion estimation algorithm and a full search (FS) algorithm, a three-step search (TSS) algorithm, a cellular search (CS) algorithm, and a new cellular diamondoid search (NCDS) algorithm that have been proposed are compared with each other for performance. Apparent from an experiment, the accuracy in the proposed method of measurement is less 50% than that in the conventional cellular algorithm, and the quality of a picture is still in a certain level. In other words, in the novel block-matching-based motion estimation, an image block may be compared more quickly, a technology of video signal compression and decompression being effectively improved very much.

However, in the description mentioned above, only the preferred embodiments according to this invention are provided without limit to this invention and the characteristics of this invention; all those skilled in the art without exception should include the equivalent changes and modifications as falling within the true scope and spirit of the present invention.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; they are not intended to be exhaustive or to be limited to the precise form disclosed.

A New Cellular Search (NCS) Algorithm provided in this invention is like a general block search algorithm assuming that, in a search window, the more a candidate block and a current block lie far from an optimal matching block, the more an error value becomes, and the less the candidate block and the current block lie far from the optimal matching block, the less the error value becomes. Under such a common view, the algorithm is described below. The estimation may be carried out using a processing device well-known in those skilled in the art.

Figure 1:
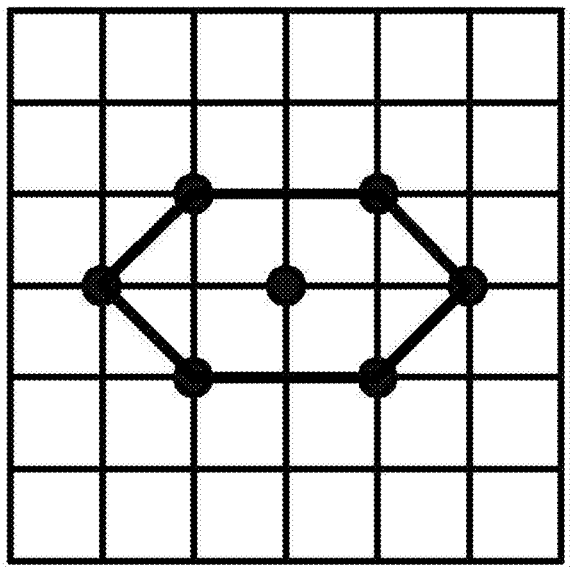
FIG. 1 is a schematic view illustrating an HCSP search pattern and a VCSP search pattern according to this invention.
Figure 1:
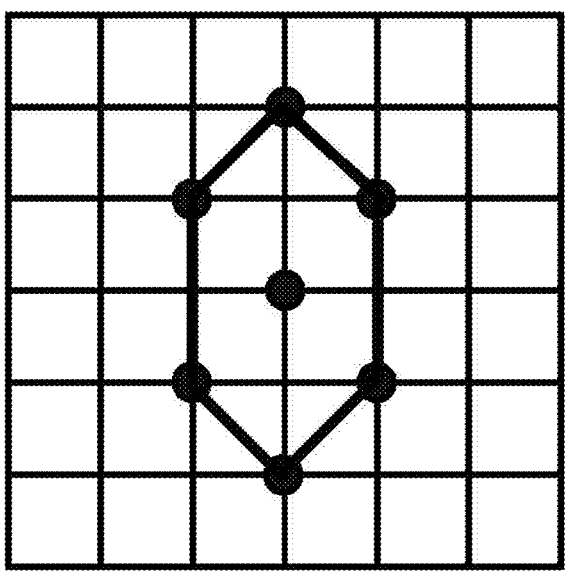
Figure 2:
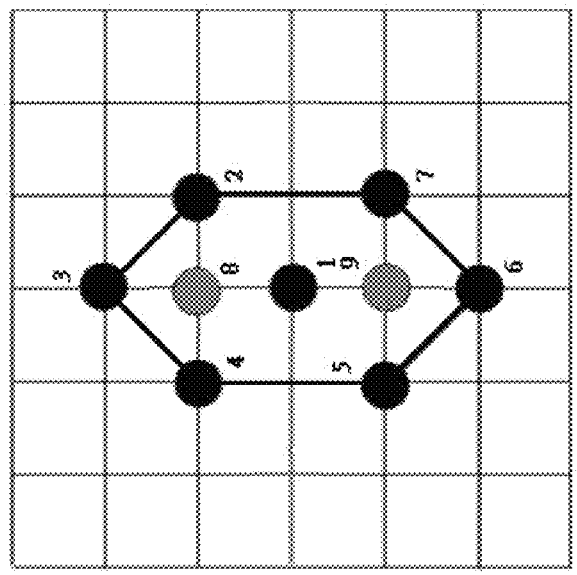
FIG. 2 is a schematic view illustrating search points according to this invention, in which points 1 through 7 are the search points at step 1 and points 8 and 9 are the search points at step 3.
Figure 2:
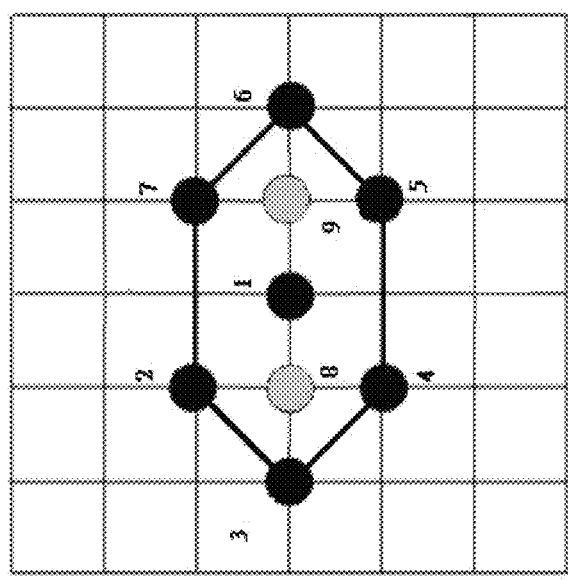

In the novel block-matching-based motion estimation, two search modes are used, respectively a Horizontal Cellular Search Pattern (HCSP) and a Vertical Cellular Search Pattern (VCSP), as shown in FIG. 1. In the process of search, when a minimum value of block distortion is not in the search pattern of central point, HCSP and VCSP are used alternately. If the minimum value of block distortion occurs horizontally, HCSP is used, or if the minimum value of block distortion occurs vertically VCSP is used. The steps of novel block-matching-based motion estimation are described below in conjunction with FIG. 2.

At step 1, 7 points in HCSP are calculated.

The origin in the area of search is first set to a central search point in the pattern of HCSP and the coordinates are set to (0, 0). Next, error values between six candidate points and the central point around the block and HCSP are calculated. If a minimum error value occurs at the central point, jump to step 3; if it occurs at the rest of six candidate points outside, then go on to execute step 2.

At step 2, newly added search points are re-calculated in HCSP or VCSP.

If the minimum error value occurs horizontally, the position of the minimum error value as MAD searched at step 1 is set to a new central point in HCSP; on the contrary, if the minimum error value occurs vertically, it is set to a new central point in VCSP. Calculation is made again for a new error value as MAD. If the minimum error value as MAD lies in the central point of HCSP or VCSP, directly jump to step 3 or else repeat step 2.

At step 3, comparison is made between internal points 1 and 8 or internal points 1 and 9 to get a minimum MAD value. MAD values at points 3 and 6 are compared. If the MAD value at point 3 is lower, MAD values at points 1 and 8 are calculated and two lower MAD values are found; If the MAD value at point 6 is lower, MAD values at points 1 and 9 are calculated and two minimum MAD values are found. Finding the coordinates of minimum error value as MAD at this step is exactly finding an optimal motion vector for the matching block in the novel block-matching-based motion estimation.

Figure 3:
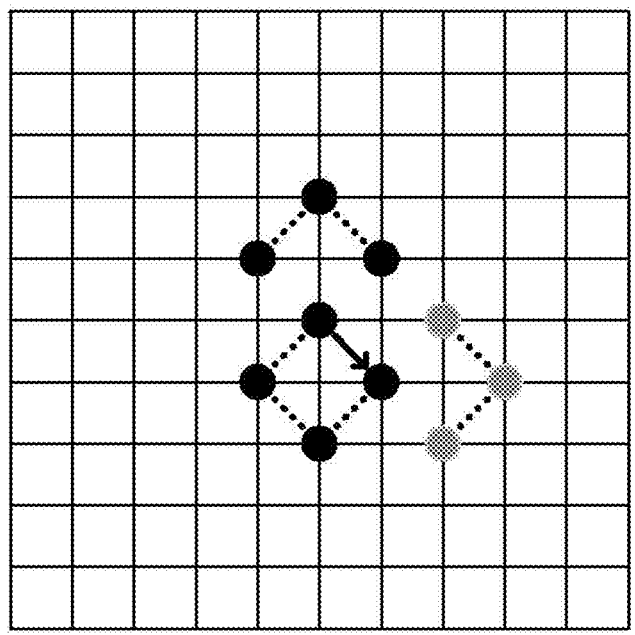
FIG. 3 is a schematic view illustrating search motion patterns of HCSP and VCSP according to this invention.
Figure 3:
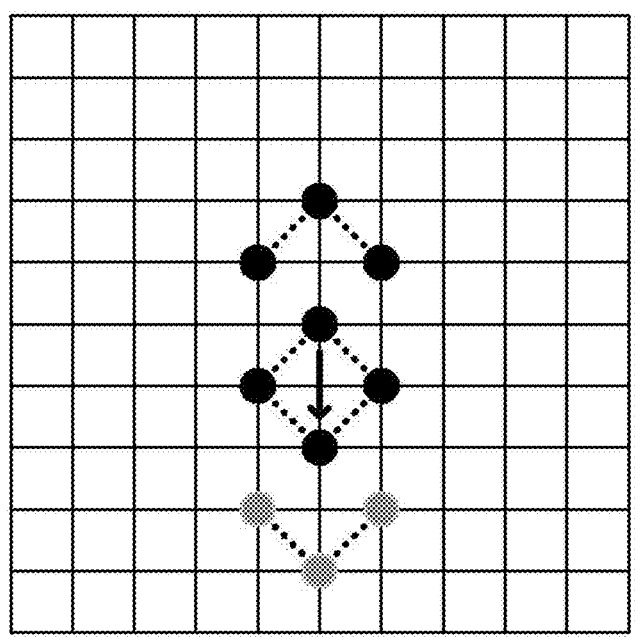

HCSP and VCSP are symmetrical search patterns, so at step 2, all 7 candidate points are not required for calculation at each time of search, as only 3 candidate points are required for calculation. The required internal search points are less than those in cellular search algorithm. The search motion pattern is shown in FIG. 3.

Figure 4:
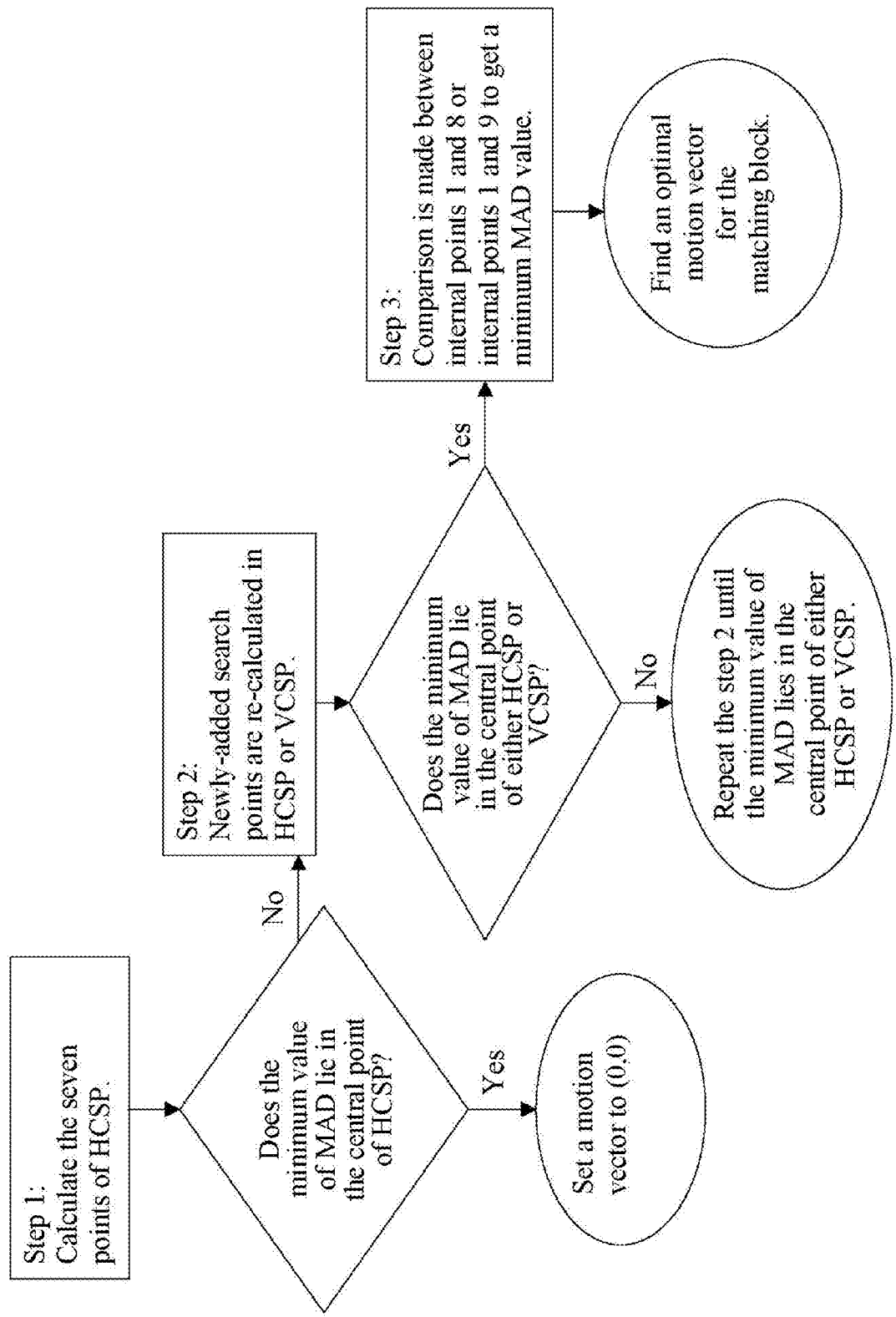
FIG. 4 is a flow chart of block matching-based motion estimation in accordance with the invention.

FIG. 4 is a flow chart of novel block-matching-based motion estimation showing the three steps of calculating the seven points of HCSP, newly-added search points are re-calculated in HCSP or VCSP, and a comparison is made between internal points 1 and 8 or internal points 1 and 9 to get a minimum MAD value, thus an optimal motion vector for the matching block is found.

Figure 5:
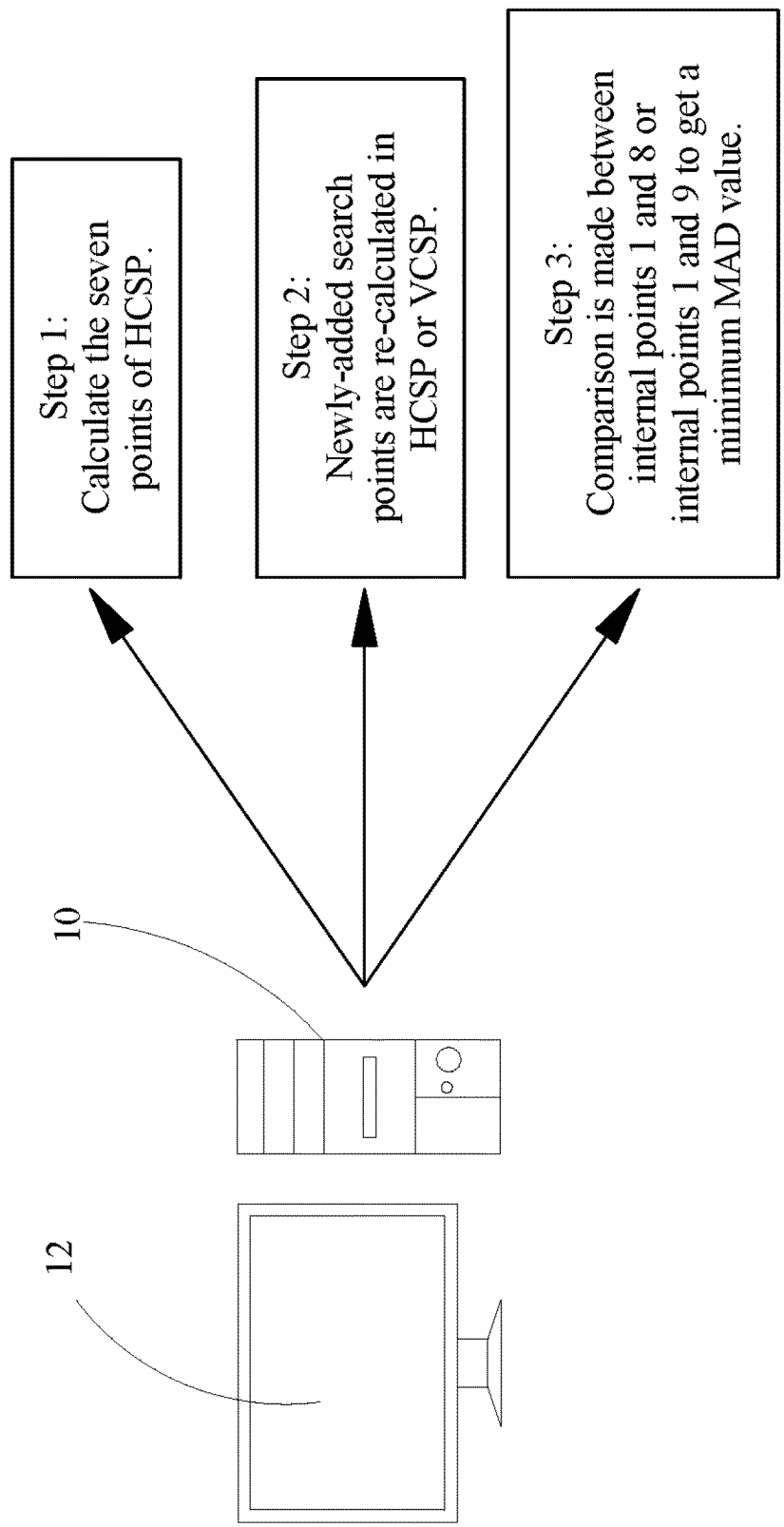
FIG. 5 depicts the calculation of steps 1-3 using a computer and output device for processing steps 1-3.

FIG. 5 depicts the calculations of Steps 1-3 using a computer 10 and output device 12.

For a valuation of performance according to this invention in the motion estimation algorithm, search speed (number of candidate points to be searched) and frame quality are required. In a general algorithm, the quality of image frame is mostly evaluated with peak signal to noise ratio (PSNR), as equation (1).

$$PSNR = 10\log_{10} \frac{255 \times 255}{\frac{1}{N \times N} \sum_{x=1}^{N} \sum_{y=1}^{N} |f(x, y) - f'(x, y)|^2} \quad (1)$$

In the equation, f(x, y) is an original frame.

In an experiment, six standard films, Salesman, Football, Susigirl, Claire, Hall, and Miss are used for analysis, and 50 pictures are used, each of which the size is 352×288 pixels, the gamma is 8 bits, and the block size is 16×16 pixels respectively. At this time, the minimum error value as MAD is used to determine whether a minimum distorted block is found. Further, the full search (FS) algorithm, the three-step search (TSS) algorithm, the cellular search (CS) algorithm, and the new cellular diamondoid search (NCDS) algorithm are compared with each other for performance.

Apparent from table 1 shown below, the PSNR given from the NCS algorithm is about the same as that given from the CS algorithm.

TABLE 1

Mean Performance evaluation (PSNR)

| Film | Algorithm | | | | |
|---|---|---|---|---|---|
| | FS | TSS | CS | NCDS | NCS |
| Salesman | 35.2744 | 35.1092 | 35.0758 | 34.4639 | 34.8216 |
| Susigirl | 34.7052 | 34.5401 | 34.4879 | 33.6261 | 33.9535 |
| Football | 22.9678 | 22.3814 | 22.3336 | 21.9596 | 22.1160 |
| Claire | 41.9041 | 41.8603 | 41.6439 | 40.9031 | 41.4042 |
| Hall | 34.4639 | 34.4026 | 34.3386 | 34.2148 | 34.2947 |
| Miss | 39.0471 | 38.9535 | 38.8865 | 37.9826 | 38.4725 |

Also apparent from table 2, the search points in the NCS algorithm are even less half than those in the CS algorithm.

TABLE 2

Average Search Point (ASP) in Each Block

| Film | Algorithm | | | | |
|---|---|---|---|---|---|
| | FS | TSS | CS | NCDS | NCS |
| Salesman | 225 | 25 | 15.8312 | 10.5277 | 7.7170 |
| Susigirl | 225 | 25 | 17.9404 | 12.1550 | 9.8262 |
| Football | 225 | 25 | 22.3453 | 12.7196 | 11.0504 |
| Claire | 225 | 25 | 16.1315 | 10.1931 | 7.2645 |
| Hall | 225 | 25 | 17.0067 | 10.7624 | 8.5537 |
| Miss | 225 | 25 | 20.1082 | 12.9847 | 11.0690 |

Also apparent from table 3, MSE given in the NCS algorithm is less different from that given in the CS algorithm.

TABLE 3

| | Indication of MSE | | | | |
|---|---|---|---|---|---|
| | Algorithm | | | | |
| Film | FS | TSS | CS | NCDS | NCS |
| Salesman | 19.2649 | 19.5295 | 20.6966 | 23.7482 | 22.0547 |
| Susigirl | 23.5344 | 25.1683 | 26.7168 | 31.8301 | 30.0965 |
| Football | 331.0834 | 374.5183 | 383.5360 | 417.8716 | 402.8845 |
| Claire | 4.1935 | 4.3136 | 4.7191 | 5.8144 | 5.8814 |
| Hall | 23.5380 | 25.2739 | 26.8613 | 28.5278 | 28.4947 |
| Miss | 8.0442 | 8.3668 | 8.5281 | 10.4580 | 9.0528 |

Complete results given from comparison and analysis are separately listed in tables 1 through 3. The evaluations of PSNR, Average Search Point (ASP), and MSE are included in the results.

In the item of PSNR, the NCS algorithm for the films of Salesman, Susigirl, Claire, Miss, and Hall is very similar to the CS algorithm, indicating that the five types of pictures are close in quality.

Compared with the MSE value in the NCDS algorithm for all the films, the MSE value in the NCS algorithm is minimum. Compared with the values in the CS algorithm for the films of Salesman, Susigirl, Claire, Miss, and Hall, the values in the NCS algorithm are less different; namely, the two algorithms are similar to each other in block matching, the values in the two algorithm being acceptable.

In the aspect of mean search point, regardless of the fast or slow motion of contents, for example, in the films of Salesman, Susigirl, Claire, Miss, and Hall, the search points in the NCS algorithm are almost less half than those in the CS algorithm. Namely, the quantity of calculation in the NCS algorithm is less than that in the CS algorithm.

To sum up, it is apparent that the picture quality given in the novel block-matching-based motion estimation is almost equal to that given in the cellular search algorithm, but much complexity is reduced at the time of operation.

Generally speaking, a complete procedure of video compression should comprise the following steps.
1. Inputted data is moved to a RAM or a buffer.
2. DC compositions are removed.
3. The best motion estimation is found to compute computing the motion compensation and prediction errors.
4. In consideration of current bandwidth and storage space, an optimal encoding codec is found.

In this invention, the best motion estimation is emphasized and consumes maximum runtime in the whole process of video compression. Generally, in the environment of a PC working, the number of mean search points in each block is direct proportional to the runtime, so the performance of runtime may be compared depending on the number of mean search points in each block.

Further, the amount of runtime also has something to do with the contents of input video data. As described above, the input data comprises a film moving fast, such as the film of Football, and a film moving slowly, such as the film of Claire. When the NCS algorithm is used, the runtime may be lowered to 45% through 54% respectively for the two types of films. When it is compared with the NCDS algorithm, it is apparent that the runtime may be lowered to 10% through 14% for the film moving fast and to 19% through 28% for the film moving slowly. In the case of image quality, when the CS algorithm is compared with the NCDS algorithm, the image quality of 0.2 db through 0.4 db gets lost respectively, and the quantity in the form of a digit is very hard to find with naked eyes. Namely, the image quality given from the NCS algorithm is similar to that given from the algorithms of CS and NCDS, but the quality is lowered very much at the time of operation.

To sum up, compared with the conventional block estimation technology (the cellular algorithm), the algorithm according to this invention reduces 50% calculation process, and in the algorithm, the image blocks may even be compared more quickly and the technology of video signal compression and decompression is effectively improved very much; it completely meets the requirements of application for the patent, and hence we apply following the patent law; we earnestly request you to examine it for details and to approve the patent as soon as possible for protection of the inventor's rights and interests.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of block-matching-based motion estimation in video coding by finding an optimal motion vector for the matching block using a data processing device, comprising the following steps, in which:

step 1, an origin in a search area is first set to a central search point in a Horizontal Cellular Search Pattern (HCSP) and coordinates are set to (0, 0); next, error values between six candidate points and the central point around a block and HCSP are calculated; if a minimum error value occurs at the central point, jump to step 3, and if it occurs at the rest of six candidate points outside, then go on to execute step 2;

step 2, if the minimum error value occurs horizontally, a position of the minimum error value as Mean Absolute Distance (MAD) searched at step 1 is set to a new central point in HCSP; on the contrary, if the minimum error value occurs vertically, it is set to a new central point in Vertical Cellular Search Pattern (VCSP) and re-calculation is made for a new error value as MAD; if the minimum error value as MAD lies in the central point of HCSP or VCSP, directly execute step 3, if not repeat step 2; and step 3, MAD values at points 3 and 6 are compared; if the MAD value at point 3 is lower, a point 8 between points 1 and 3 is added as a candidate point and MAD values at points 1 and 8 are calculated and two lower MAD values are found, and if the MAD value at point 6 is lower, a point 9 between points 1 and 6 is added as a candidate point and MAD values at points 1 and 9 are calculated and two minimum MAD values are found; finding the coordinates of minimum error value as MAD at this step finds an exact optimal motion vector for the matching block.

2. A method for block-matching-based motion estimation in video coding according to claim 1, wherein the candidate block and the current block at step 2 are compared in HCSP and VCSP with the minimum error values given in the measurement algorithm.

3. A method for block-matching-based motion estimation in video coding according to claim 1, wherein at step 2, at each time of search, only 3 candidate points may be required for calculation.

\* \* \* \* \*

UNITED STATES PATENT AND TRADEMARK OFFICE
CERTIFICATE OF CORRECTION

PATENT NO. : 8,442,117 B2
APPLICATION NO. : 13/170736
DATED : May 14, 2013
INVENTOR(S) : Jiann-Der Lee et al.

It is certified that error appears in the above-identified patent and that said Letters Patent is hereby corrected as shown below:

Title Page, Item (73) the Assignee should read
--(73) Assignee: Chang Gung University, Taoyuan County (TW)--

Signed and Sealed this
Twenty-fifth Day of June, 2013

Teresa Stanek Rea
*Acting Director of the United States Patent and Trademark Office*